Dec. 7, 1937. G. B. HOGABOOM ET AL 2,101,178
APPARATUS FOR PLATING SHEETS
Filed Dec. 13, 1934 17 Sheets-Sheet 1
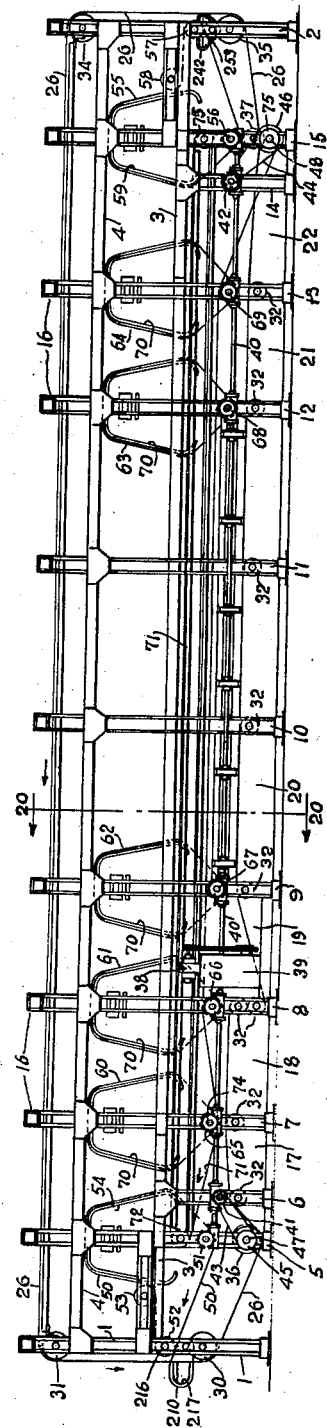
Inventors
GEORGE B. HOGABOOM,
WESLEY F. HALL,
Attorneys

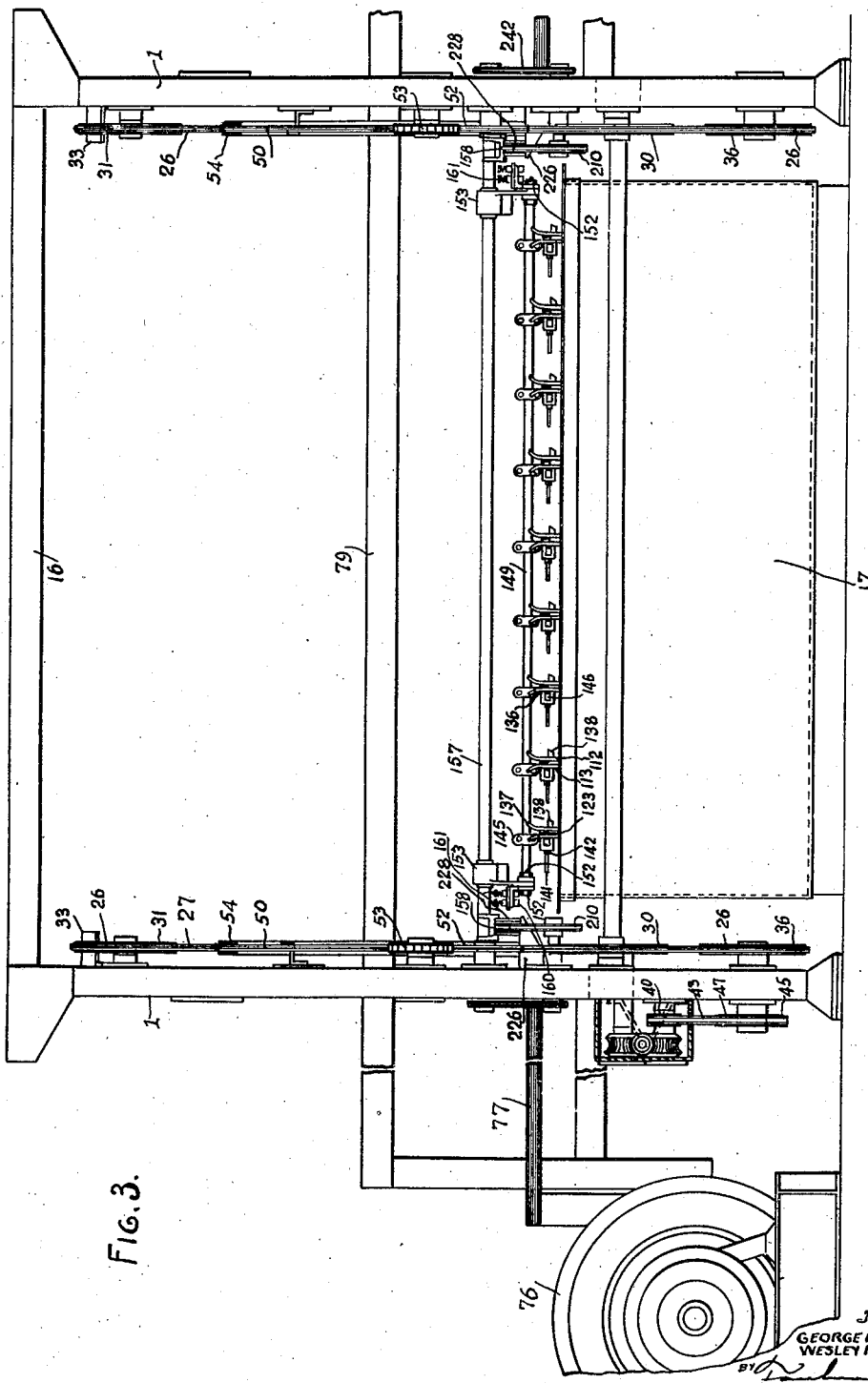

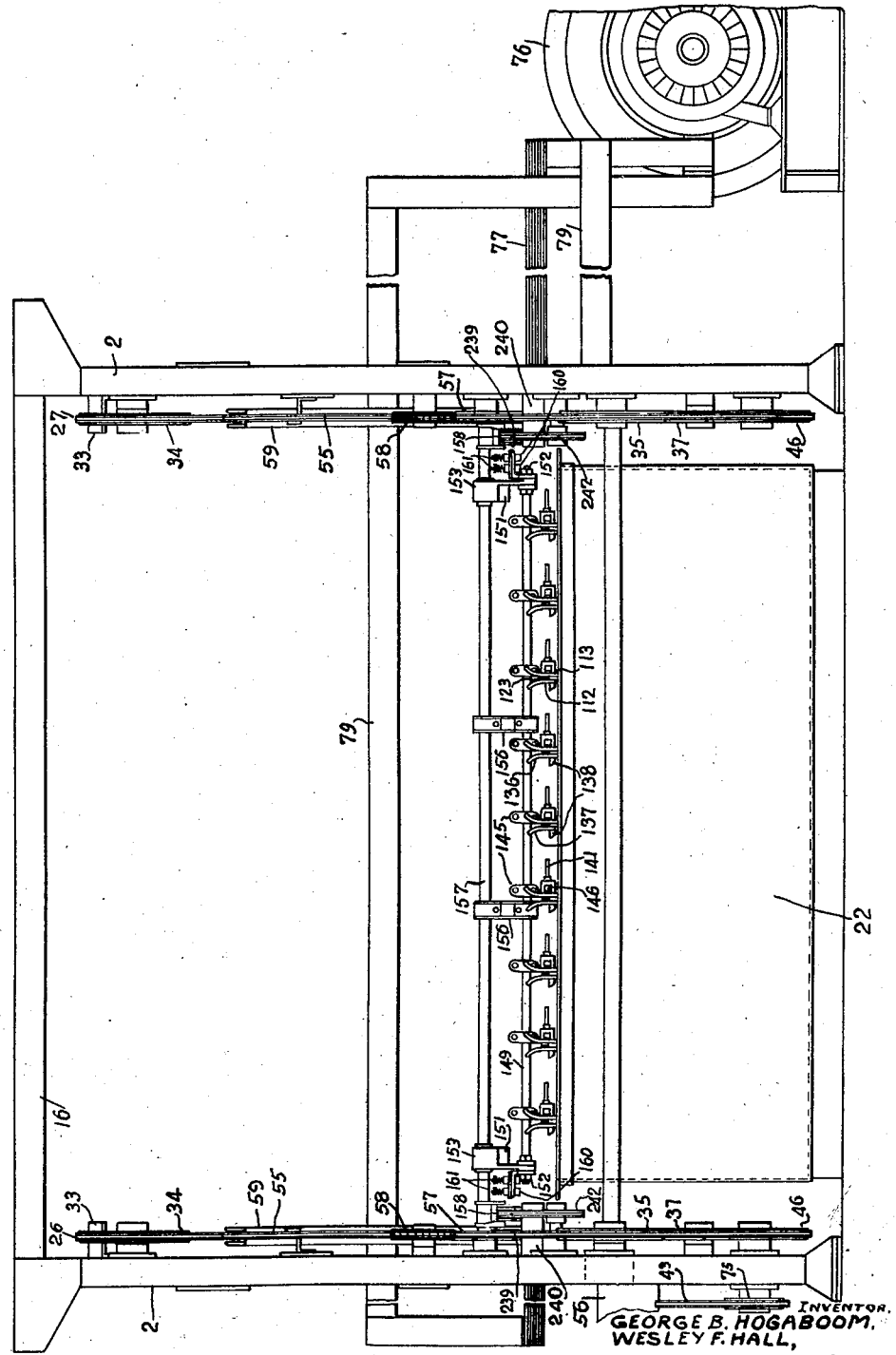

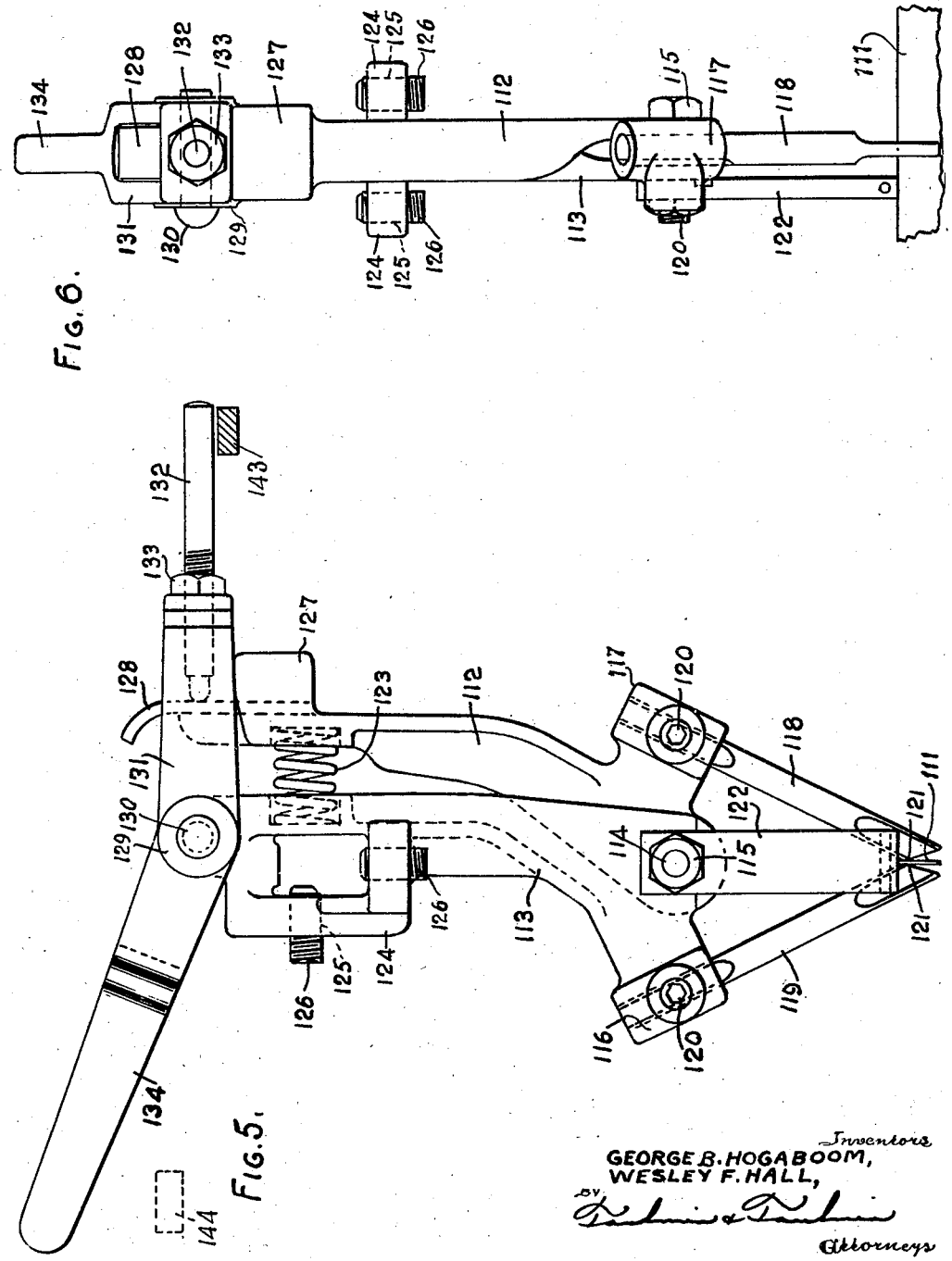

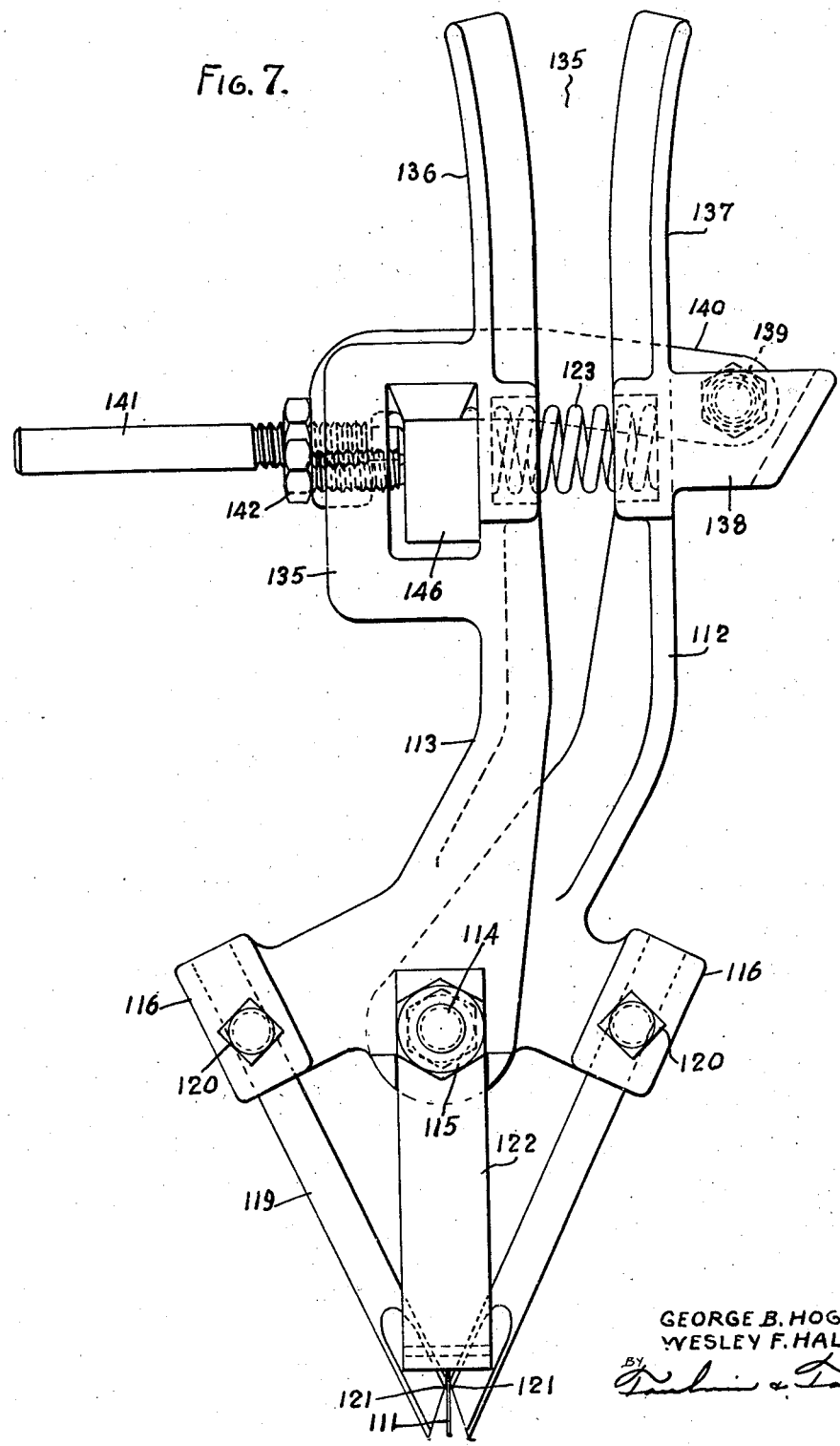

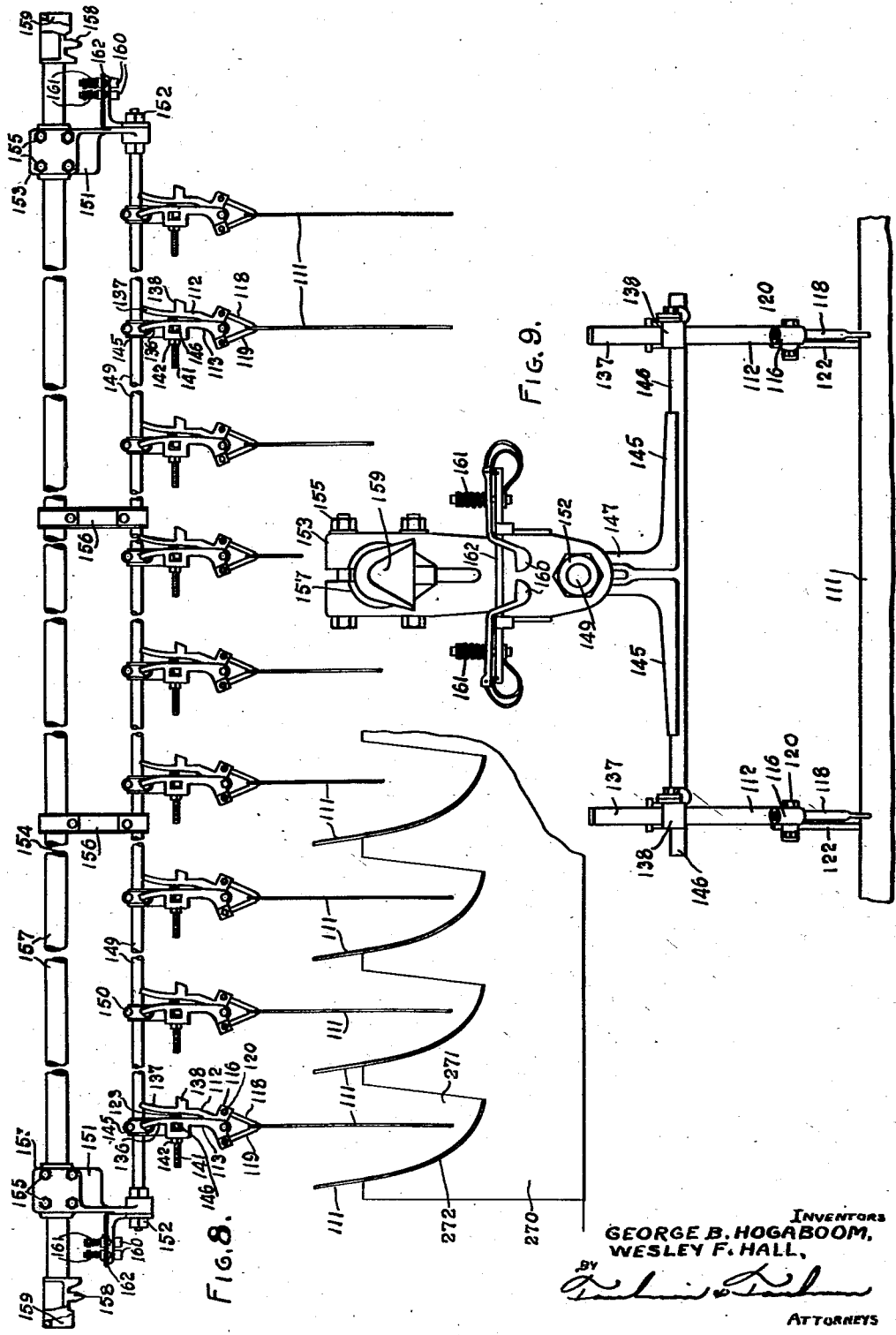

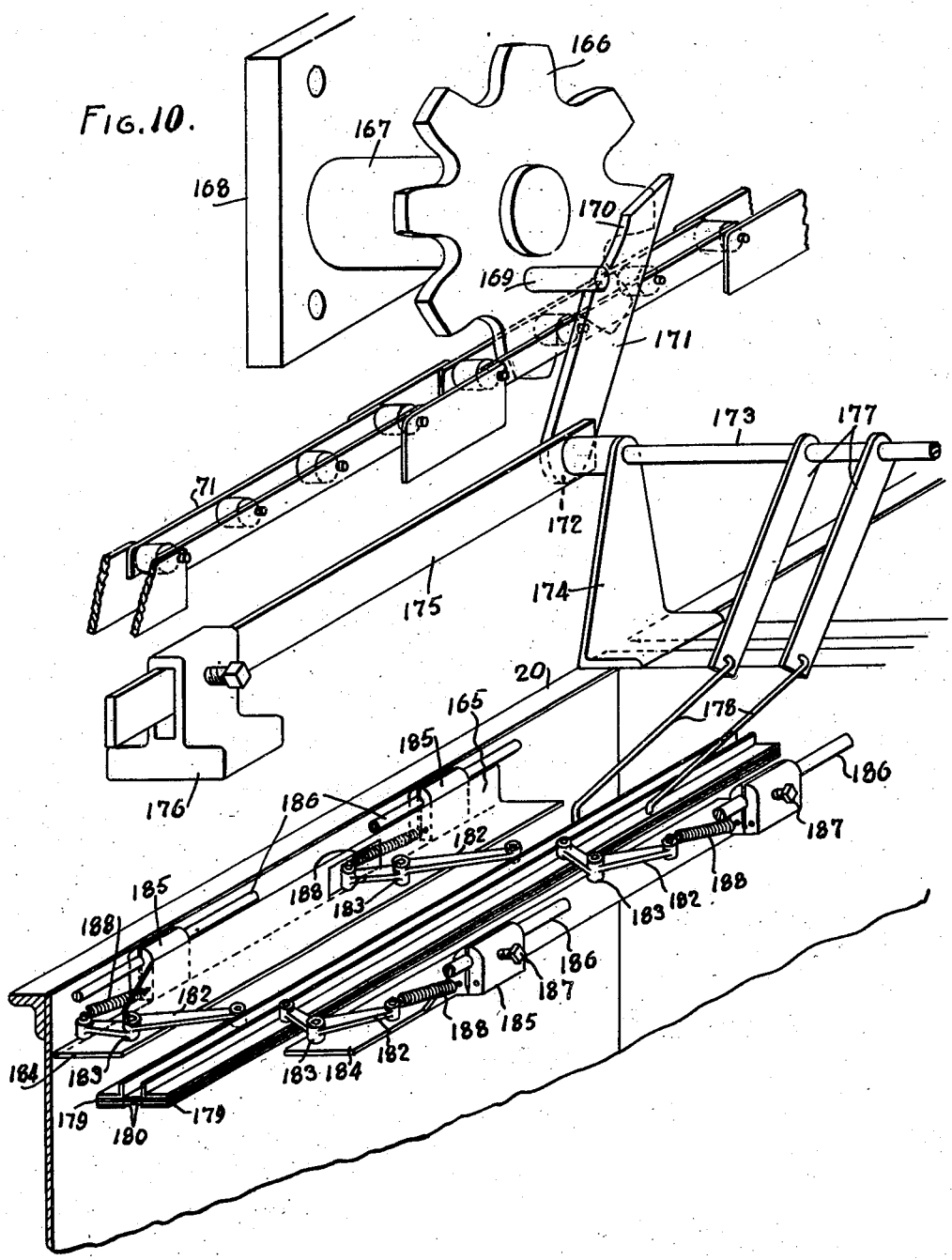

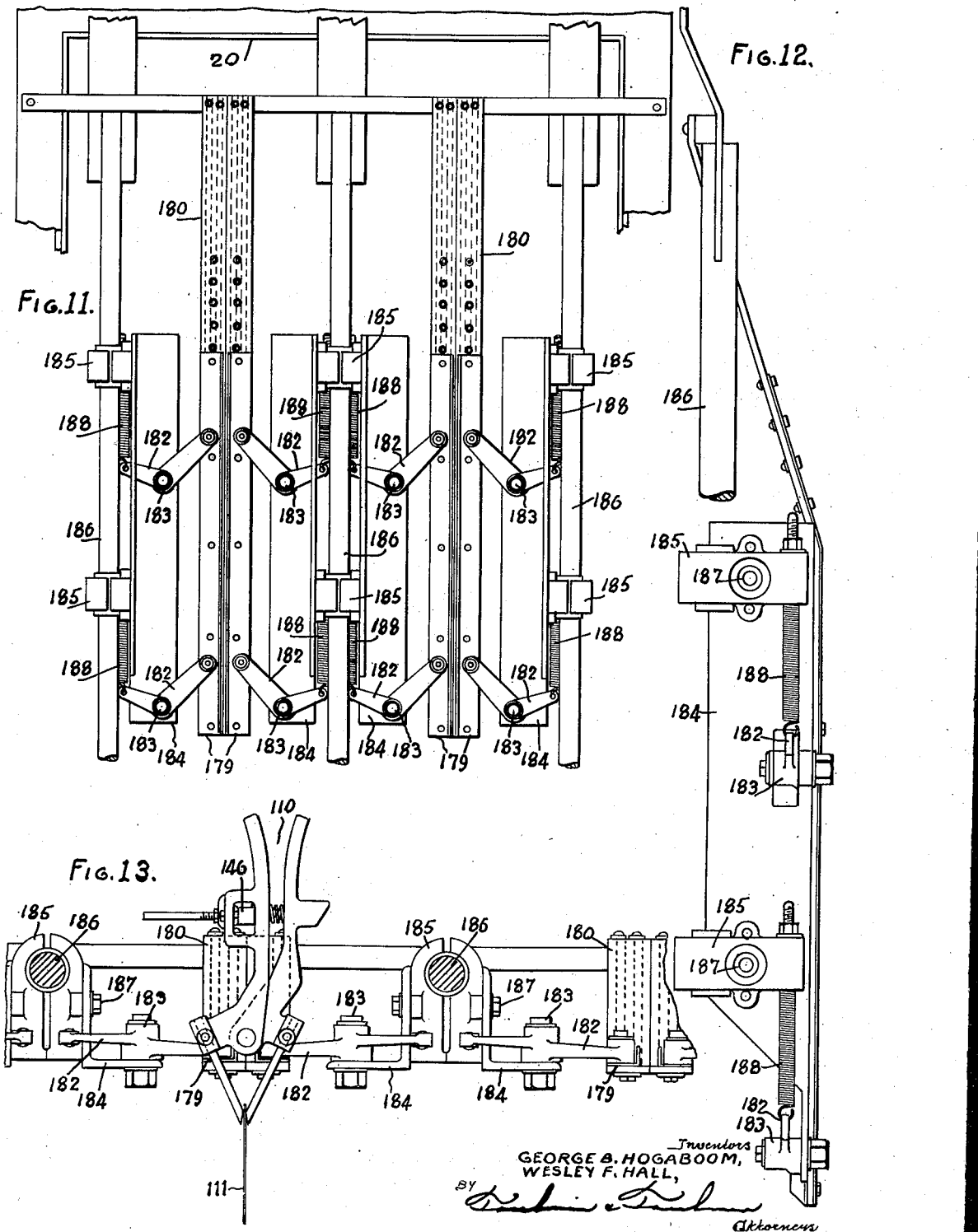

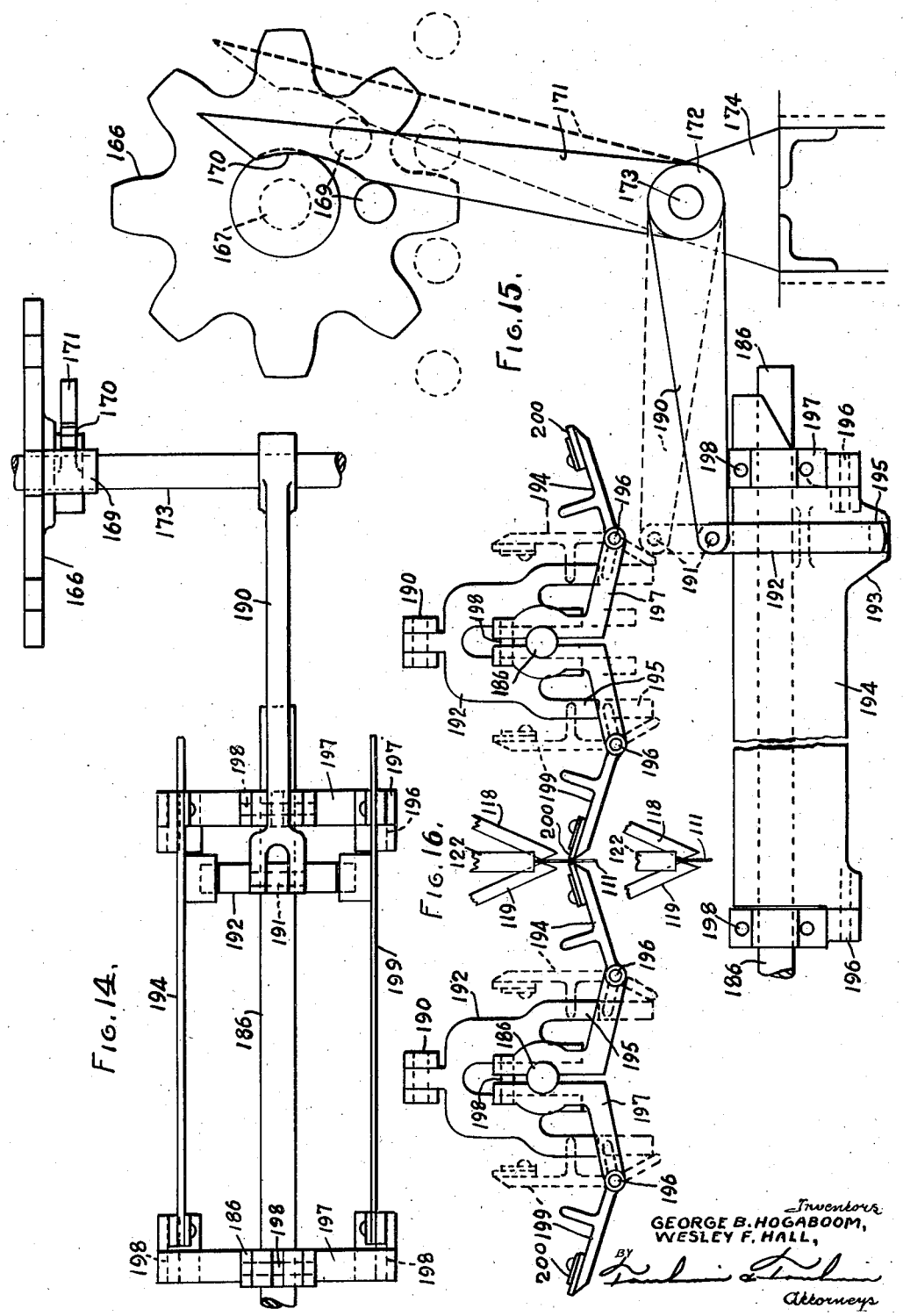

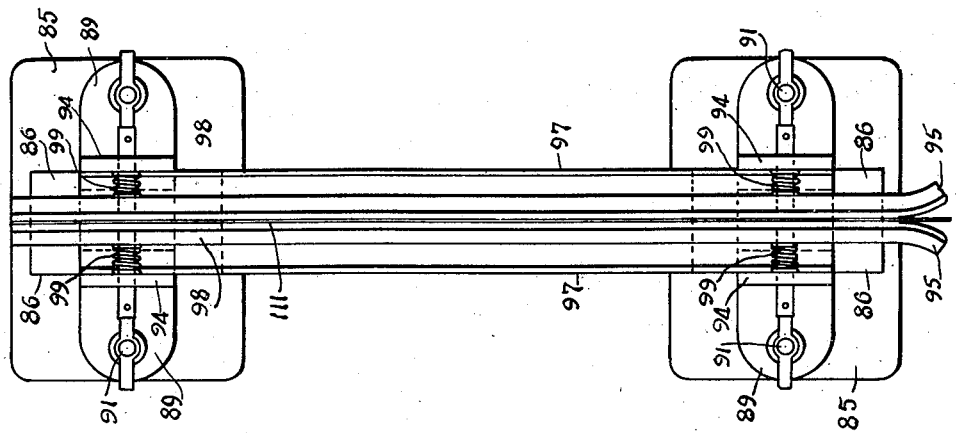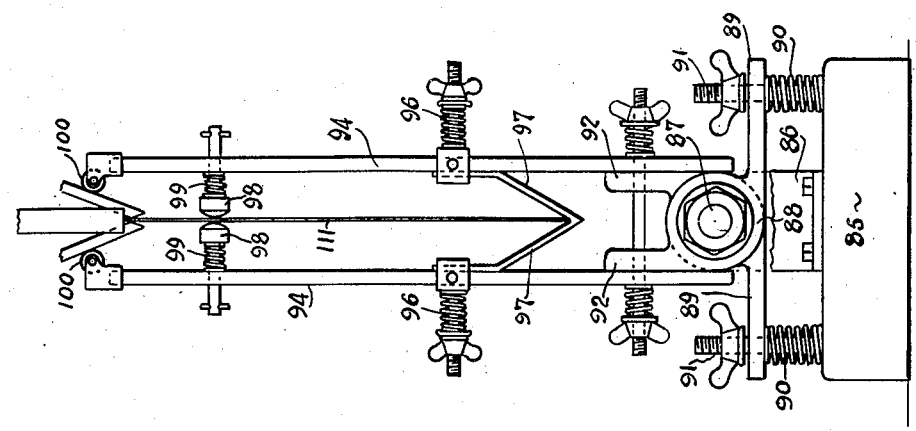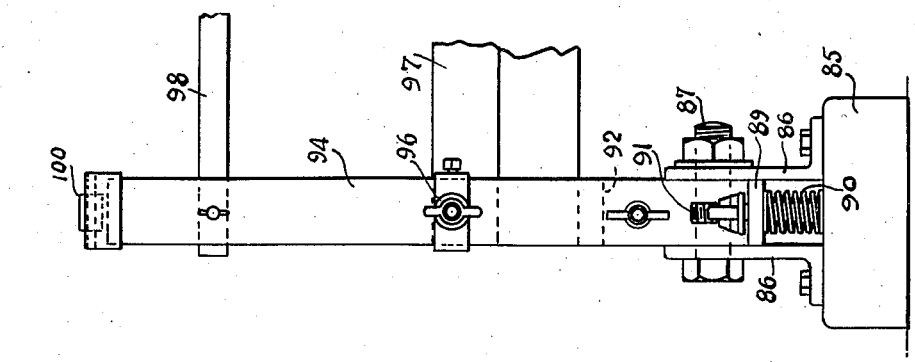

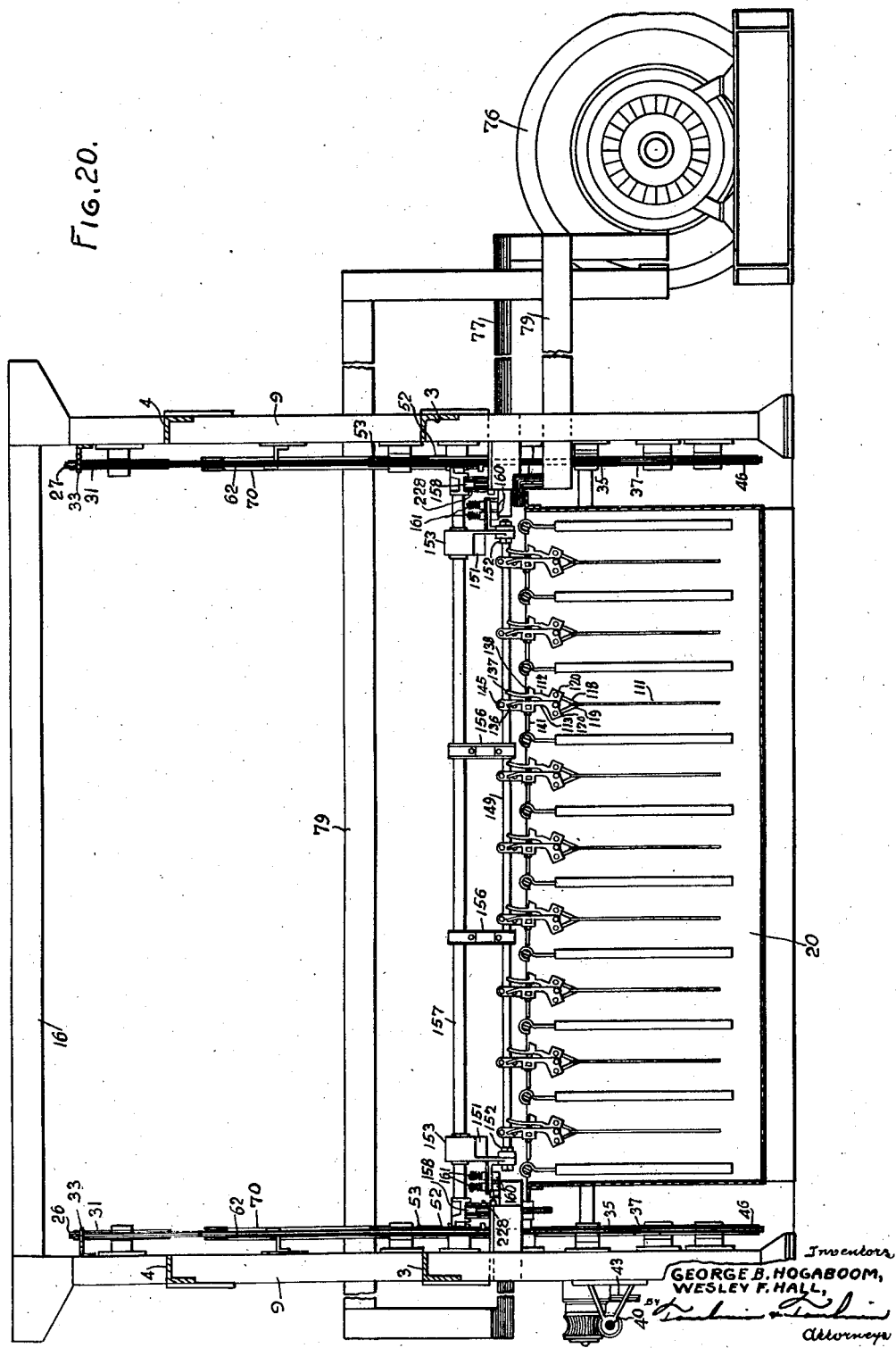

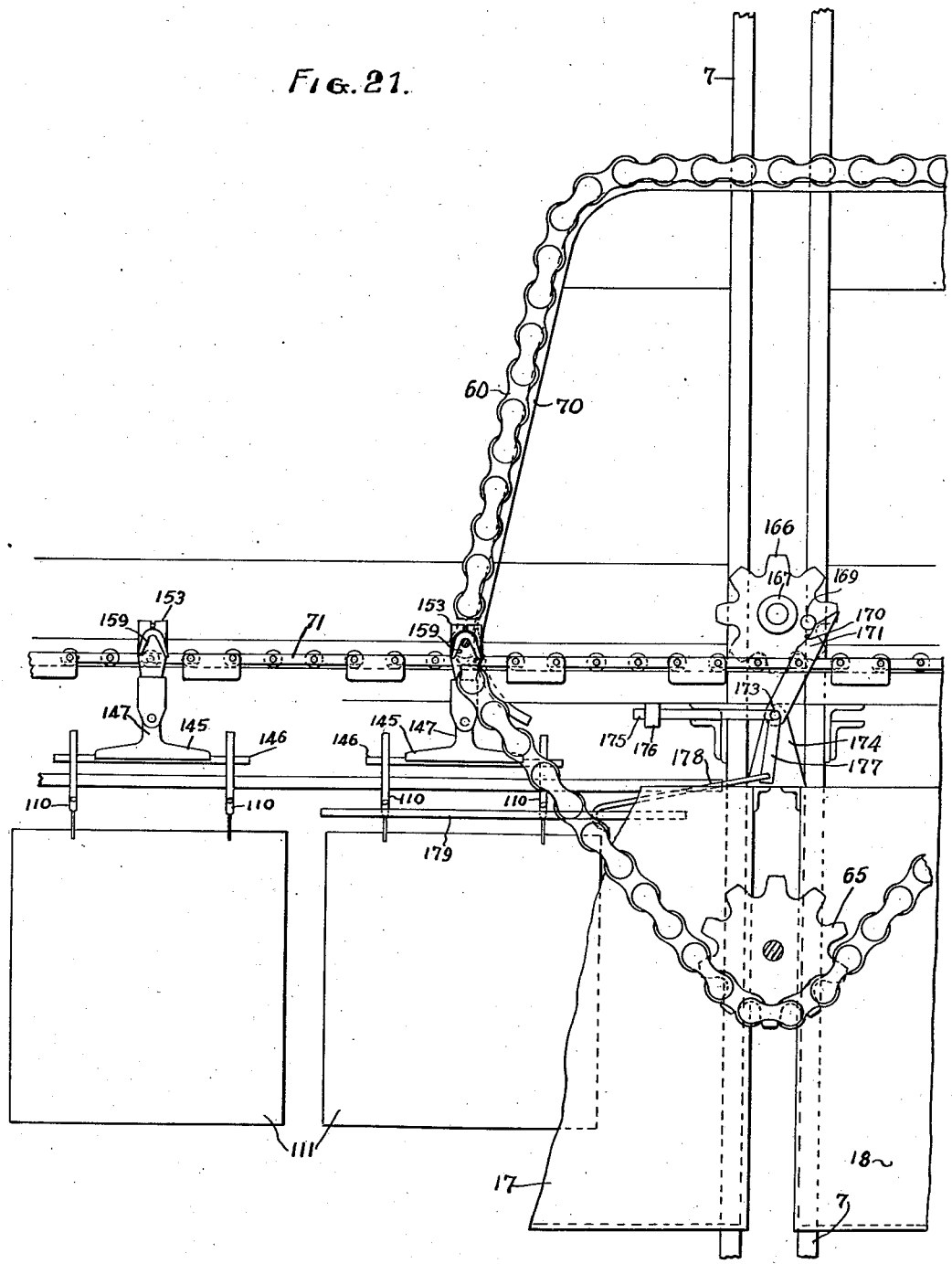

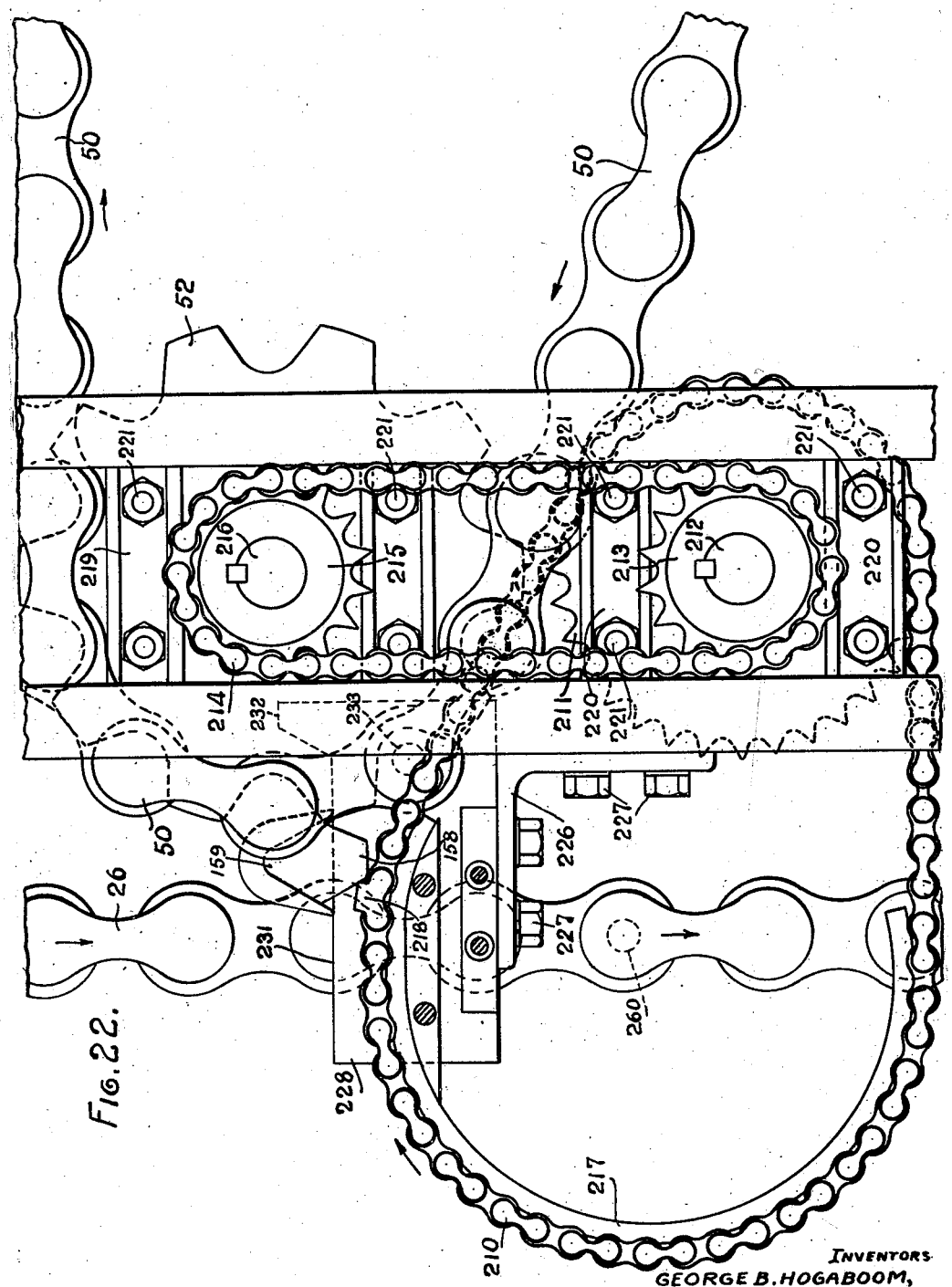

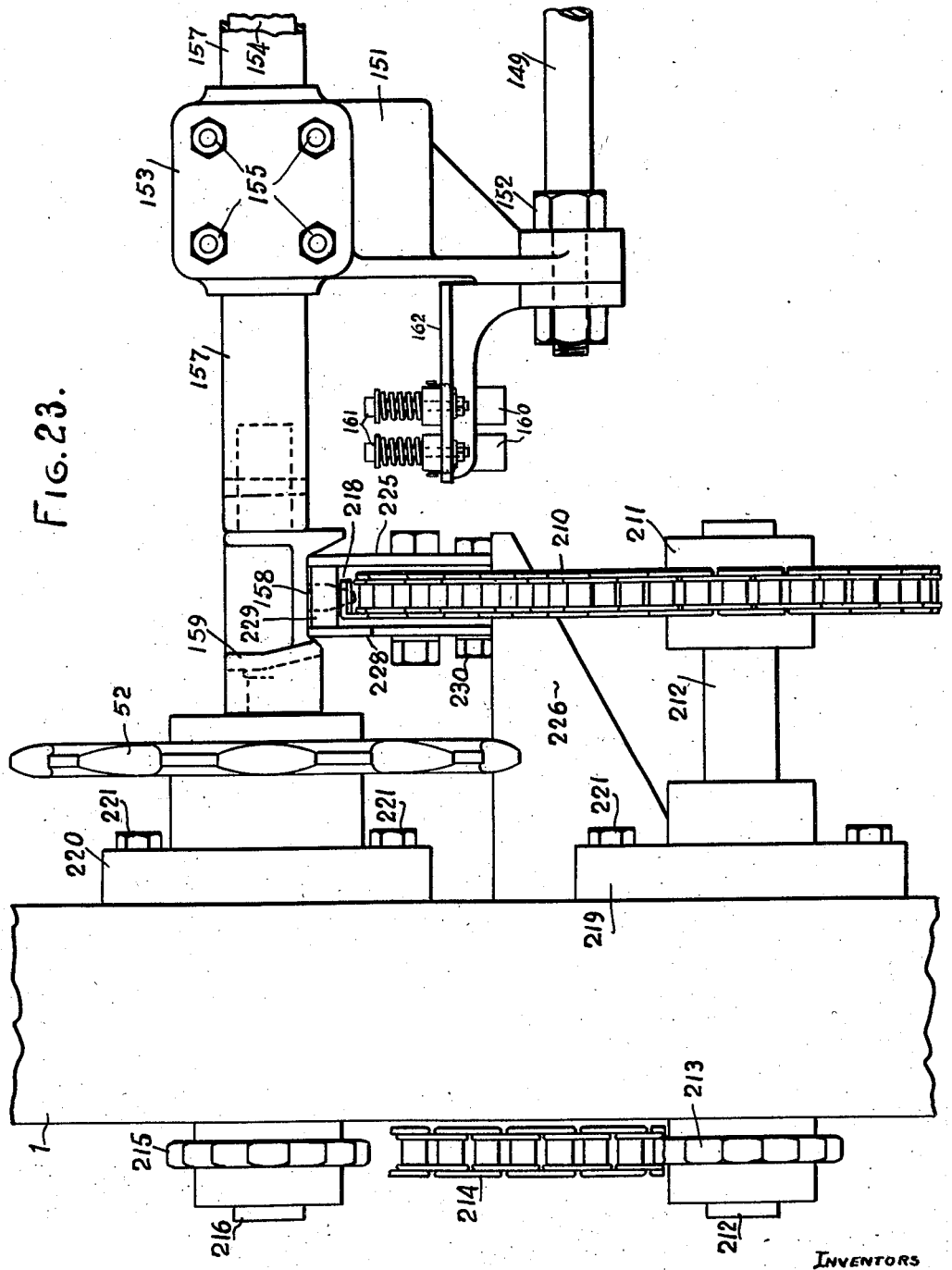

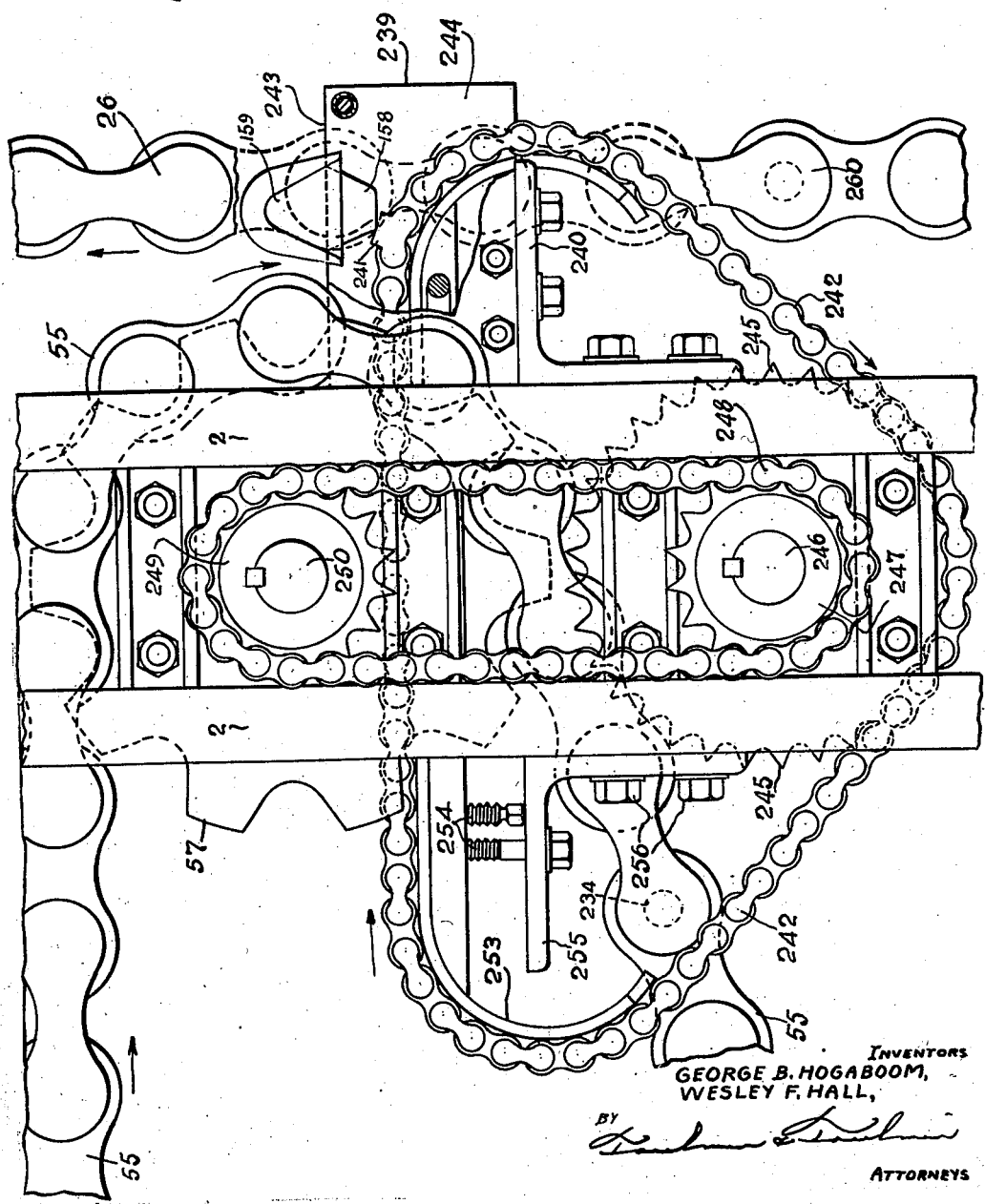

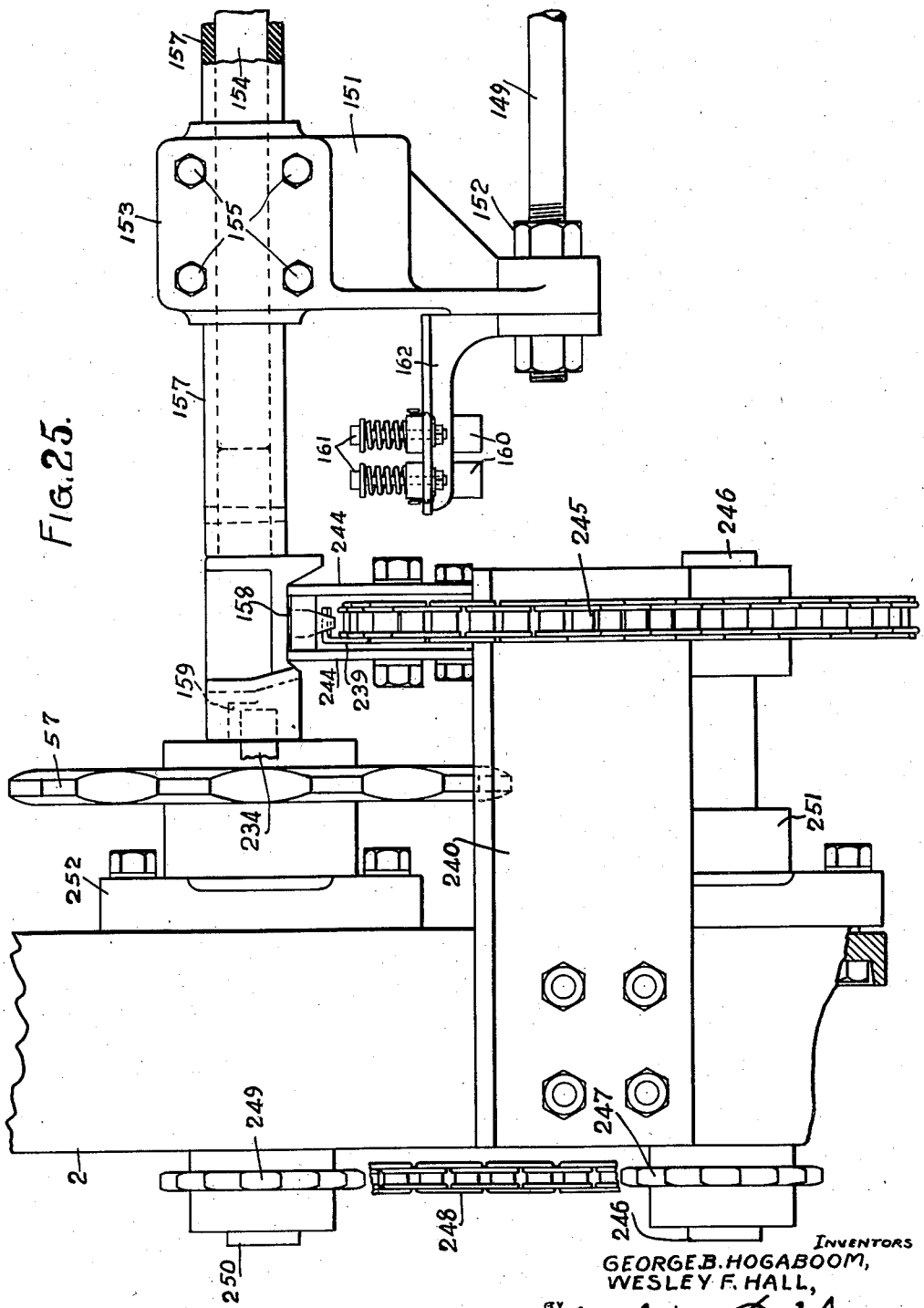

Dec. 7, 1937.   G. B. HOGABOOM ET AL   2,101,178
APPARATUS FOR PLATING SHEETS
Filed Dec. 13, 1934    17 Sheets-Sheet 17
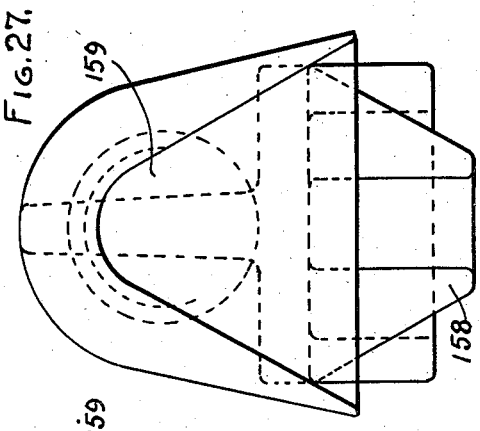
Fig. 27.
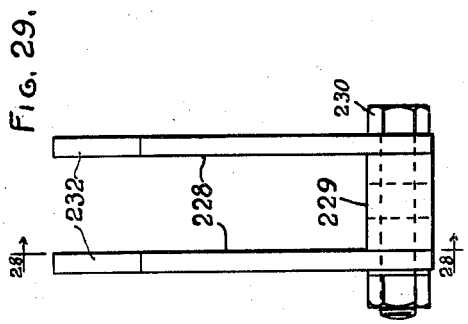
Fig. 29.
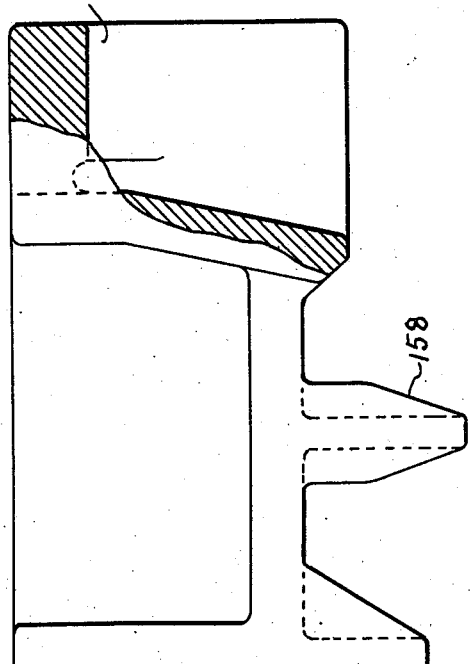
Fig. 26.
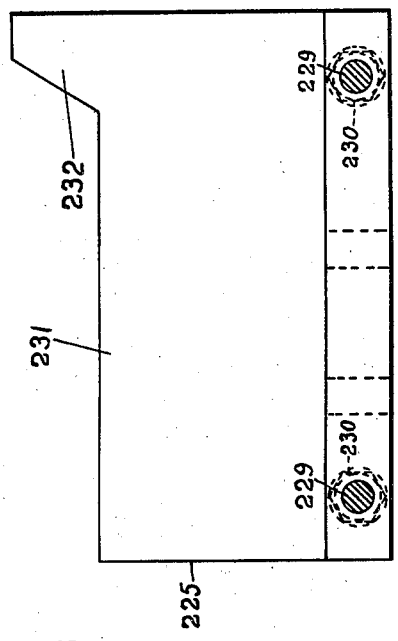
Fig. 28.
INVENTORS
GEORGE B. HOGABOOM,
WESLEY F. HALL,
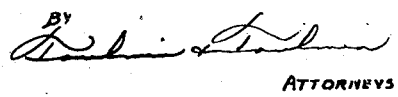
ATTORNEYS

Patented Dec. 7, 1937

2,101,178

UNITED STATES PATENT OFFICE

2,101,178

APPARATUS FOR PLATING SHEETS

George B. Hogaboom, New Britain, Conn., and Wesley F. Hall, Matawan, N. J., assignors to Hanson-Van Winkle-Munning Company, Matawan, N. J., a corporation of New Jersey Application December 13, 1934, Serial No. 757,314

12 Claims. (Cl. 204—5)

This invention relates to electroplating apparatus and, in particular, to apparatus of this type which is used for the plating of metal sheets.

One object of our invention is to provide an apparatus whereby metal sheets may be electroplated and similarly treated by being carried between the various processing stations on conveyors.

Another object is to provide apparatus for electroplating metal sheets, wherein the metal sheet is engaged by a clamp mounted on a carrier bar, the latter being moved on conveyor chains through the various tanks, and transferred from tank to tank by transfer mechanism.

Another object is to provide an apparatus for electroplating metal sheets in which there is a clamp, the jaws of which are automatically engaged and disengaged by means encountered in their passage through the apparatus.

Another object is to provide an apparatus for electroplating metal sheets in which there is a clamp in which the jaws are of a material to which the plated metal is non-adherent, whereby any metal deposited thereon during the electroplating operations may be quickly and easily removed, as by stripping.

Another object is to provide an apparatus for electroplating metal sheets in which there is a clamp having latch means for holding the jaws in one position, as in an open position, this latch means being operated either by hand or automatically by cams or similar tripping mechanisms, arranged at appropriate positions in the apparatus.

Another object is to provide an apparatus for electroplating metal sheets in which there is a work carrier bar to which the clamps are attached and which is of a truss-like character providing great strength and rigidity at a minimum weight.

Another object is to provide an apparatus for electroplating metal sheets in which there is wiping means for removing the liquid from the surfaces of the sheet as it passes out of the solution tank, thus returning the liquid to the tank and reducing waste.

Another object is to provide an apparatus for electroplating metal sheets in which there is wiping means of this character, in which the wiping members cooperate in timed relationship with the work carriers and clamps in such a manner as to be opened when the clamps arrive at the wipers, and closed immediately after the clamps pass between the wiping members.

Another object is to provide an apparatus for electroplating metal sheets in which there is a holding rack for holding the metal sheets to be plated in such a manner that they are yieldably pressed to the clamps in a position to be quickly and easily engaged by the latter.

Another object is to provide an apparatus for electroplating metal sheets in which there is a conveying device wherein the carrier bars are carried from the drag chains to the transfer chains without shock to or dislodgment of the work sheets.

In the drawings:

Figure 1 is a diagrammatic side elevation showing the relationship of the apparatus of our invention to one embodiment of the general apparatus in which it may be used;

Figure 2 is a diagrammatic plan view of the apparatus shown in Figure 1;

Figure 3 is a diagrammatic left-end elevation of the apparatus shown in Figures 1 and 2, at the loading end of the machine;

Figure 4 is a diagrammatic right-end elevation of the apparatus shown in Figures 1 and 2, at the unloading end of the machine;

Figure 5 is a front elevation of the automatically actuated work-holding clamp of our invention;

Figure 6 is a side elevation of the automatic clamp shown in Figure 4;

Figure 7 is a front elevation of the clamp of Figures 5 and 6, with the upper portion modified for manual operation;

Figure 8 is a front elevation of the carrier bar of our invention;

Figure 9 is an end elevation of the carrier bar shown in Figure 8;

Figure 10 is a perspective view of the wiping device of our invention, showing the reciprocating wiping members;

Figure 11 is a plan view of the reciprocating wiper shown in Figure 12;

Figure 12 is a side elevation of the reciprocating wiper shown in Figure 10;

Figure 13 is an end elevation of the reciprocating wiper shown in Figure 10;

Figure 14 is a plan view of a pivoting type of wiper which is a modification of the wiper shown in Figure 10;

Figure 15 is a side elevation of the pivoting wiper shown in Figure 14;

Figure 16 is an end elevation of the wiper shown in Figure 14;

Figure 17 is a side elevation of the holding rack for holding the metal sheets in position to be engaged by the clamps on the machine;

Figure 18 is an end elevation of the holding rack shown in Figure 17;

Figure 19 is a plan view of the holding rack shown in Figure 17;

Figure 20 is a cross section through the apparatus along the line 20—20 of Figure 1;

Figure 21 is a somewhat diagrammatic side view showing the means by which the sheets to be plated are conveyed horizontally through the tanks, transferred vertically over the boundaries therebetween, and wiped free of liquid while being transferred;

Figure 22 is an enlarged side elevation, partly in section, of the inter-chain conveying means at the loading end of the apparatus for transferring the work carrier bars from the main conveyor chains to the first transfer chains, the view taken looking outwardly from the inside of the machine and with the near side plate removed;

Figure 23 is an enlarged end elevation of the apparatus shown in Figure 22;

Figure 24 is a side elevation similar to Figure 22, but showing the inter-chain conveying means in side elevation at the unloading end of the machine, the view taken looking from the inside of the machine and with the near side plate 244 of the set-down cradle removed, showing in dotted lines the position of the carrier bar;

Figure 25 is an end elevation of the apparatus shown in Figure 24;

Figure 26 is an enlarged side elevation, partly in section, of the end of one of the work carrier bars;

Figure 27 is an end elevation of the device shown in Figure 26;

Figure 28 is a longitudinal section through the set-down cradle at the loading end of the machine, taken along the line 28—28 of Figure 29;

Figure 29 is a lefthand end elevation of the set-down cradle shown in Figure 28, especially from the tank containing the electroplating solution.

Apparatus generally described

The apparatus of our invention in general consists of a frame in association with a series of processing tanks, and having conveyor chains along side of the tanks for transporting carrier bars from which the work pieces are suspended. Separate transfer chains are arranged at the partitions between the tanks so as to transfer the carrier bar and work pieces over these partitions from tank to tank. A conveying device is provided at the loading and unloading ends of the apparatus in order to facilitate the passing of the carrier bar from the main conveyor chain (known as the "drag chain") to the transfer chains without excessive shock or possible dislodgment of the work sheets. The work pieces, which are in the form of metal sheets, are held by clamps which are attached to arms mounted on the carrier bars. The apparatus is provided with tripping means for tripping the latch members of these clamps and causing their jaws to engage or disengage, as desired, in order to grasp or release the work pieces.

The apparatus is provided with a wiping device for removing the liquid clinging to the work sheets, as they are drawn out from the processing tanks, especially from the tank containing the electroplating solution. A holding rack is provided for holding the metal sheets in a position where they may be quickly grasped and withdrawn by the clamps as these arrive in the appropriate positions.

General arrangement of the conveying apparatus and tanks

Referring to the drawings in detail, Figures 1 to 3 inclusive show the general apparatus which is used for conveying the work through the various tanks, as well as the tanks themselves. These three figures are diagrammatic, in that they omit details which form no part of the present invention.

The apparatus as a whole consists of a framework composed of vertical end members or pillars 1 and 2 joined by horizontal frame members 3 and 4 to the intermediate vertical members or pillars 5, 6, 7, 8, 9, 10, 11, 12, 13, 14 and 15. Cross members 16 serve to interconnect the tops of these vertical pillars.

Arranged between the opposite rows of pillars (Figure 2) are the various processing tanks. In the embodiment shown in Figure 2, these tanks consist of an acid tank 17, cold-rinsing tanks 18 and 19, a plating tank 20, a cold-rinsing tank 21 and a hot-rinsing tank 22. The solutions used in these tanks are of the character known to those skilled in the art, and vary with the particular kind of metal which is to be deposited upon the work pieces.

The framework comprising the vertical pillars and horizontal members interconnecting them is provided with main conveyor chains or "drag chains" 26 and 27 of an endless type and arranged on opposite sides of the tanks 17 to 22. These chains run from the loading station, generally designated 28, to the unloading station at the opposite end of the machine (Figure 1), generally designated 29. The drag chains 26 and 27 on the pillars 1 are supported by suitable sprockets 30 and 31 respectively as well as by intermediate sprockets 32 arranged upon the intermediate vertical pillars 6 to 13 inclusive. The chains 26 and 27 are supported along their upper reaches by the guide troughs 33, which extend from one end of the machine to the other end and are supported by the vertical pillars of the framework. At the unloading station 29, the chains 26 and 27 are supported by suitable sprockets 34 and 35 mounted upon the end pillars 2.

The driving mechanism for the main conveyor chains 26 and 27 forms no part of the present invention. The driving connection is applied at the driving sprockets 36 mounted on the pillars 5, and guided by the sprockets 37 upon the pillars 15. The power received from the driving motor 38 (Figure 1) passes through the reduction gear box 39, whence it is carried by the longitudinal shafts 40 running between the vertical pillars 5 and 15. The pillars 6 and 14 are provided with the sprockets 41 and 42 which receive power from the shafts 40 and transmit this power by means of the chains 43 and 44 to the sprockets 45 and 46 mounted upon the pillars 5 and 15. The sprockets 45 and 46 are mounted upon the shafts 47 and 48, hence the chains 26 and 27 are driven by this arrangement.

The apparatus (Figure 1) is likewise provided with transfer chains for transferring the work pieces from tank to tank over the partitions between the tanks. In the embodiment shown in Figure 1, the lefthand end of the machine is provided with the opposite transfer chains 50 which are driven from the sprockets 51 receiving power from the shafts 40, and mounted upon the vertical pillars 5. The transfer chains 50 pass around the guide sprockets 52 on the vertical pillars 1, thence over the guide sprockets 53 and around the guide channel members 54. The latter provide guidance for the chains 50 in an orbital path of irregular outline.

In a similar manner, the unloading station 29 of the apparatus is provided with transfer chains 55 on opposite sides of the tank 22 and driven from the sprockets 56 on the vertical pillars 15, and receiving power from the longitudinal shafts 40. The transfer chains 55 likewise pass around guide sprockets 57 and 58, and through guide channel members 59 in a manner similar to that previously described for the transfer chains 54.

The intermediate transfer chains 60, 61, 62, 63 and 64 are provided at positions opposite the partitions between the tanks 17 and 18, 18 and 19, 19 and 20, 20 and 21, and 21 and 22 respectively. They are driven by the sprockets 65, 66, 67, 68 and 69 respectively, mounted upon the vertical pillars 7 to 13 inclusive and driven from the longitudinal shafts 40 in a manner similar to that previously described for the end transfer chains 54 and 55. The intermediate transfer chains 60 to 64 inclusive are guided throughout the remainder of their extent by the guide channel members 70, these being of similar construction and having grooved portions adapted to cause the transfer chains to move in an orbital path of irregular outline.

Between the various transfer chains extend the secondary conveyor chains 71 in a longitudinal direction along the sides of the tanks. At their lefthand ends the conveyor chains 71 are supported upon sprockets 72 mounted on the vertical pillars 5, whereas at their righthand ends the sprockets 73 upon the vertical pillars 15 serve a similar purpose. The secondary conveyor chains 71 are driven by the sprocket 74 on the pillar 7, receiving power from the longitudinal shafts 40; and also by the sprocket 75 mounted upon the shaft 48 which is driven from the shaft 47. The latter is driven by the sprocket 46 receiving power from the shafts 40 and the sprocket 42 through the chain 44. Thus when the previously described mechanism is set in motion, the main conveyor chains 26 and 27 move synchronously around the outside of the frame structure; the transfer chains similarly move synchronously around their respective orbits; and the secondary conveyor chains 71 move horizontally to convey the carrier bars between the transfer chains. It will be understood that the carrier bars extend across the frame between the oppositely disposed sets of conveyor chains, as will be described later.

The electrical current by which the metal is caused to be deposited upon the work pieces is produced in the motor generator unit 76. The positive terminals thereof are connected to the typical anode bars 77 and 78, which extend along the electroplating bath. The anodes are suspended in the solution from these bars, and consist of rods, disks or other suitable shapes of the metal to be electro-deposited. The negative terminal of the motor generator 76 is connected to the cathode conductor 79, which connects it to the cathode bars 80 and 81, running along the opposite edges of the electroplating tank 20. Contact between the work pieces and the cathode bars is made in a manner subsequently to be described.

Holding rack for sheets

The work pieces to be electroplated by the apparatus of our invention are in the form of metal sheets, and pass through the apparatus in an edgewise direction. The sheets customarily used are three feet long and two and one-half feet wide, but greater or lesser dimensions may obviously be employed. These sheets may be so thin that they are incapable of supporting themselves when placed edgewise in a vertical direction, hence a special holding rack has been devised for this purpose. (Figures 17 to 19).

This holding rack consists of a base 85 having brackets 86 projecting upwardly and supporting a shaft 87 upon which the angle members 88 are pivotally supported. The horizontal arms 89 of the angle members 88 are urged upwardly by the coil springs 90 surrounding the pins 91. The vertical arms 92 of the angle members 88 are urged apart by the coil springs 93, but with a lesser tension than that of the coil springs 90.

Attatched to the vertical arms 92 of the angle members 88 are the side members 94, these being disposed in a vertical direction and having outwardly flared portions 95 at one end. The latter serve to facilitate the entrance of the sheet as it is placed in the holder by the workmen.

The side members 94 are provided with adjustable members 96 between which extends the trough or bottom rest 97. By loosening the clamps 96 and sliding them up or down the side members 94, the holder may be adapted to receive different sizes of sheets to be plated.

The lower edge of the sheet rests in the trough ports 97, whereas near its upper edge it is engaged by the pressure fingers 98 which are urged toward one another by the coil springs 99. At the upper ends of the side members 94 are the contact rods 100. These are so positioned that the work-holding clamp, hereinafter described, will encounter them and align the holder so that the clamp is properly directed downward to engage the work sheets. The latter are placed in the holder by the workmen in such a manner that their upper edges extend slightly above the contact fingers 98. The holder just described is used at the loading end of the machine, as at the station 28 (Figure 1).

For the unloading end of the machine, any suitable receiver may be used for receiving the plated and unloaded sheets, such as the one shown in Figure 8. This consists of a base 270 having a plurality of troughs 271 arranged beneath the work-holding clamps 110. Each trough 271 has a curved wall 272 on one side thereof which prevents damage to the edges of the sheets 111 after they drop from the clamps 110, and permits the sheets 111 to nest if they are allowed to pile up, such as might occur during an adjustment or because of a temporary breakdown of some part of the apparatus. The sheets 111 thus accumulating are prevented by their close contact with one another from drying or tarnishing, and are held in the receiving troughs 271 until the operator is able to resume sending them along to the remaining stages of the process.

Work-holding clamps

The work-holding clamps 110 of our invention are adapted to grasp the work sheets 111 firmly, yet with the minimum area of contact. This small area of contact must be located near the edge of the sheet in order that if any defect is occasioned by its presence it will not cause excessive spoilage of the product; in other words, so that but a slight part of the edge need be removed in order to eliminate the spots where the clamps 110 engage the work sheets 111.

The automatic work-holding clamp 110 (Figures 5 and 6) consists of a pair of plier-like arms 112 and 113, which are pivotally connected to one another by the bolt 114 held in place by the nuts 115. The arms 113 and 112 at their forward ends are provided with bosses 116 and 117 which are bored to receive the clamp tips 118 and 119. The latter are secured to the bosses 116 and 117 by the set screws 120. The tips 118 and 119 are made from suitable material to which the plated metal will not adhere, or else they are coated with such a material. In practice we have found that the tips 118 and 119 may be of alloy steel or of steel coated with chromium, as by electroplating. It has been found that the metal deposited upon the work sheets during the electroplating operation also deposits itself upon these tips, but may be itself stripped from the tips by hand, since it does not adhere firmly. This arrangement results in a considerable saving of material, as well as in providing clean contact tips for holding the work pieces.

The ends of the tips 118 and 119 are provided with the thinned and beveled portions 121, which engage the work sheets. A stop bar 122 is mounted near the pivot bolt 114 and held in place by the nut 115. It serves to regulate the distance below the top of the sheet to which the contact portions 121 of the tips engage the metal sheets. The tips 118 and 119 may obviously be adjusted by loosening the set screws 120.

The upper portions of the clamp arms 112 and 113 are urged away from one another by the coil spring 123, so that the tips 118 and 119 are forced into contact with one another at their contact portions 121, or else they are urged to grip the work sheet between these portions. The arm 113 is provided with an extended portion 124 which has a bore 125 by which the clamp is attached to the clamp mounting and held by the set screws 126. The clamp arm 112 is similarly provided with an extension 127, which serves to receive a latch contact member 128 of a flexible character, and having a bent upper portion to facilitate its engagement by the latch member.

The upper end of the clamp arm 113, above the extension 124, is provided with a boss 129 through which passes the pivot bolt 130. The latter pivotally supports the latch member 131. This is of yoke-like construction, having an adjustable engagement pin 132 at one end. The latter is held in place by the nut 133, and serves to engage the latch contact member 128. The outer end of the pin 132 is adapted to be engaged by tripping mechanism, such as a cam or stop, whereby the latch member 131 may engage the latch contact member 128 or be freed therefrom. This cam or stop 143 is mounted in any suitable way. Similarly, the end 134 of the latch member 131 may also be engaged by cam means or other stop mechanism 144 to force the latch member 131 in the opposite direction. It will also be obvious that the pin 132 may be forced in either direction by suitable mechanism, this action serving to separate the tips 118 and 119 or to cause them to engage one another. When the pin 132 engages the latch contact member 128, the tips 118 and 119 are separated so that the contact points 121 are spaced apart from one another. This releases the metal sheet held between them. When, however, the pin 132 is forced upward out of engagement with the latch contact member 128, the coil spring 123 comes into play to force the tips 118 and 119 toward one another, gripping the metal sheet between them.

For manual operation, the clamp may be modified as shown in Figure 7. The manual clamp in its lower portions is substantially the same as the automatic clamp 135. The arms 112 and 113 at their upper ends are provided with the handle portions 136 and 137, which may be gripped between the hands of the operator in much the same manner as a pair of scissors or pliers. The arm 112 is provided with an extension 138 which serves as a mounting for the pivot pin 139 pivotally supporting the latch 140. At its opposite end, the latter is provided with the contact pin 141 which is adjustably held in position by the nut 142. The tip of the contact pin 141 is adapted to engage the clamp holder, thereby separating the tips 118 and 119 and releasing the work sheets held between them. When the latch member 140 is raised, this holding action is released, so that the tips 118 and 119 are urged into engagement with the work piece by the coil spring 123. In other respects the manual clamp 135 is substantially similar to the automatic clamp 110 previously described.

*Work carrier bar and clamp holders*

Two clamps 110 are utilized in supporting each sheet of metal to be plated. These clamps are bolted to the clamp holders 145 (Figures 8 and 9). The clamp holders 145 are of inverted T-shaped construction, holding the clamps 110 at the ends 146 of their cross bars in the manner previously described. The vertical portion 147 of the clamp holder 145 is provided with a yoke portion 148, which encircles the truss rod 149 and is held in engagement therewith by the screws 150. In the embodiment shown in Figure 8, nine clamp holders 145 are arranged at intervals along the truss rod 149, each clamp holder having two clamps 110.

The truss rod 149 is supported at each end by the brackets 151, and by the nuts 152, engaging the threaded ends thereof. The upper end of the bracket 151 is provided with a yoke portion 153, which encircles the main supporting bar 154 and is held in engagement therewith by the screws 155. The secondary brackets 156 assist in supporting the truss rod 149 at points nearer its mid-portion. The main supporting bar 154 is preferably covered with a rubber coating 157 by which it is insulated from the brackets 151 and 156, hence from the truss rod 149 and the clamp holders 145. The ends of the main supporting bar 154 are provided with pins 158 by which they engage the conveyor chains 26 and 27 or 71. The ends are also provided with sockets 159 which are adapted to be engaged by pins extending from the transfer chains 54, 55 and 60 to 64 inclusive.

The electric current is conveyed from the cathode bars 80 and 81 to the work sheets 111 by way of the brackets 151, the truss rods 149, the clamp holders 145 and the clamp 110. Contact with the cathode bars 80 and 81 is made by the contact fingers 160 which are yieldingly supported, as by the coil springs 161 (Figure 9) upon the arms 162 secured to the brackets 151. The springs 161 force the contact fingers 160 into secure engagement with the cathode bars 80 and 81 as the work carrier bar, generally designated 144, moves over the tank 20.

The truss-like construction of the carrier bar 144 causes it to possess great strength and rigidity without excessive weight. At the same time, the brackets interconnecting the main supporting rod 151 and the truss rod 149 form a structure which resists sagging.

*Wiping device*

In electroplating articles, as the article passes out of the electroplating solution, it carries a certain amount of the solution along with it. This solution is ordinarily lost by being transferred to the following rinse tank. In electroplating metal sheets, for example, it has been found that about seven cubic centimeters of solution adhere to each square foot of surface, hence the wastage in the course of a day amounts to a considerable figure.

To eliminate this waste of solution and to return the adhering solution to its own tank, the wiping devices shown in Figures 10 to 16 have been provided. These wiping devices are of two types. The type shown in Figures 10 to 13 has reciprocating arms, whereas that shown in Figures 14 to 16 has pivoting arms. The purpose of both types is the same, namely, to remove solution from the work sheets 111 as they pass upward from the electroplating bath 20.

The wiping devices are located at a point near the end walls of the electroplating tank, as indicated by the dotted area 165 (Figure 2). The reciprocating type of wiping device will first be described.

The wiping device, generally designated 165, is synchronized with the motion of the conveyor chains so that the wiping members open and close at predetermined times. To accomplish this, one of the conveyor chains, for example, conveyor chain 71 (Figure 10), is engaged by a sprocket 166 loosely mounted upon a stub shaft 167 held by a frame bracket 168. The sprocket 166 is provided with a contact pin 169, and it has the proper number of teeth to insure the correct timing of the opening and closing of the wiping device, as described below. For example, if a conveyor chain is used having a four-inch pitch with thirty-two inches between the attachment points of successive carrier bars, an eight-tooth sprocket 166 may be used, the pin 169 being operative over two teeth.

The pin 169 on the sprocket 166 engages a curved portion 170 of a lever 171, whose lower end 172 is rigidly secured to the cross shaft 173. The latter is rotatably supported in the frame brackets 174. The shaft 173 is provided with a counterweight lever 175 rigidly attached thereto and having an adjustable counterweight 176 thereon. Consequently the counterweight 176 has the effect of urging the curved portion 170 of the lever 171 into contact with the contact pin 169 of the sprocket 166.

Also rigidly mounted on the cross shaft 173 are the arms 177 which are joined by the loosely mounted connecting rods 178 to the wiper bars 179. The latter are provided with wiping members 180, these being made of fabric, rubber or any other suitable material for engaging the surfaces of the work sheets and removing the liquid therefrom.

The wiper bars 179 are pivotally attached, as at 181, to the bent levers 182, these being loosely mounted at their mid-portions on fulcrums 183 attached to the bases 184. The latter are held by the split clamp members 185, adjustably engaging the supporting rods 186, the clamp members 185 being clamped by the clamp screws 187. The supporting rods 186 are mounted between the ends of the tank and in the embodiment shown are used as anode rods from which the anodes are suspended in the solution. To the free ends of the bent levers 182 are attached the tension springs 188, the opposite ends of which are secured to the split clamp members 187. The springs 188 urge the bent levers 182 in such a direction as to force the clamping bars 179 toward one another and cause the wiping members 180 to engage the surfaces of the metal sheets.

The wiping device 165 is so arranged and timed that the wiping bars 179 are separated as the sheet 111 approaches them, it being held by the clamps 110. At this instant the carrier bar 144 is being carried horizontally by means of the carrier chains 26 and 27 upon which it rests. The sheet 111 is being carried along through the solution with the tips of the clamps 110 just below the surface. (Figure 21).

The wiping bars 179 are normally held in an open position while the lever 171 is in its vertical or dotted position (Figure 15) before being engaged by the contact pin 169. The counterweight 176 accomplishes this purpose, resisting the action of the coil springs 188, which tend to close the wiping bars 179.

As the sheet 111 moves between the separated clamp bars 179, the latter remain open until the carrier bar 144 arrives at the point where its sockets 159 are engaged by the pins on the vertical transfer chains. The carrier bar 144 and its contents are then lifted bodily from the horizontal chains 71 and carried vertically by the transfer chains, such as the transfer chains 63. At this instant the contact pin 169 reaches the curved portion 170 of the lever 171 and forces it outward, turning the shaft 173 in clockwise direction against the action of the counterweight 176. This causes the arms 177 and the connecting rods 178 to move in the opposite direction to the lever 171, allowing the wiping bars 179 to approach one another through the influence of the coil springs 188.

When the wiping members 180 engage the sheet, the clamps 110 and the carrier bar 144 have moved upward until the clamp tips 118 and 119 have passed above the wiping bars 179. The wiping members 180 then engage the opposite surfaces of the metal sheets and wipe off the liquid as the sheet 111 moves upward. This liquid drops back into the tank 20, instead of being wasted, as would be the case if no wiping device were used. As the bottom edge of the sheet passes the wiping members 180, the contact pin 169 on the sprocket 166 reaches the end of the curved portion 170 which it engages during a quarter revolution, and the lever 171 returns to its dotted position, operating the wiping bars 179. The wiping device is then in position to receive another sheet 111, which meanwhile is approaching it on another carrier bar 144, and the foregoing cycle of operations repeats itself.

The pivoting type of wiping device (Figures 14 to 16 inclusive) is similar in its general arrangement to the reciprocating type previously described, and is actuated in the same manner by the sprocket 166 engaging the lever 171 through the contact pin 169. Rigidly attached to the cross shaft 173, however, are arms 190, whose outer ends are pivotally attached, as at 191, to contact yokes 192, whose lower ends 195 engage the elbow portions 193 of the pivoted wiping bars 194. The wiping bars 194 are pivotally mounted as at 196, so that they may be tilted to and fro much in a manner of a trap door. The pivotal connection 196 is supported by split clamp members 197 which are clamped to the anode rods 186, as by the clamp screws 198.

In its normal position, when not engaged by the pin 169 of the sprocket 166, the lever 171 occupies the dotted position shown in Figure 15. In this position the arms 190 are dropped together with the contact yokes 192, so that elbows 193 of the wiping bars are forced downward, causing the opposite ends 199 to fly upward into open, and separated positions. In this condition the work sheets 111 and the clamp tips 118 and 119 can move between the wiping bars 194 and start upward when the carrier bars 144 are engaged by the vertical transfer chains 63 in the manner previously described. The sheet 111 moves upward and the sprocket 166 rotates until the clamp tips 118 are passing the closed positions of the clamp bars 194. At this point the contact pin 169 engages the curved portion 170 of the lever 171, causing the arms 190 and contact yokes 192 to rise, releasing the elbow portions 193 of the clamp bars 194. The weight of the wiping portions 199 thereof then causes the wiping bar portions 199 to move downward until their wiping members 200 engage the surfaces of the sheet 111, as it is drawn upward.

After the lower edge of the sheet 111 passes upward beyond the wiping members 200, the contact pin 169 passes the curved portion 170, releasing the lever 171. The latter returns to the dotted position (Figure 15), whereupon the arms 190 and the contact yokes 192 drop downward, again opening the wiping portions 199 of the wiping bars 194. At this juncture, another sheet 111 on another carrier bar 144 has arrived at a point opposite the entrance to the now-opened wiping bars 194, and the foregoing cycle of operations repeats itself.

*Inter-chain conveyors*

In Figures 22 to 25, inclusive, are shown the inter-chain conveyors at the loading and unloading ends of the machine. These inter-chain conveyors are employed to transport the work carrier bars from the main conveyor chains 26 to the end transfer chains 54 or 55, or vice versa. The object of providing these inter-chain conveyors is to prevent the shock which might otherwise occur when the carrier bar is transferred from the chains 26 moving in one direction to the chains 50 or 55 moving in another direction or vice versa.

The inter-chain conveyor at the loading end of the machine (Figures 22 and 23) consists of the inter-chain conveyor chains 210 mounted on the opposite sides of the machine and driven by the sprockets 211 drivingly secured to the shaft 212. The latter also carries the sprocket 213, by which it is driven through the sprocket chain 214 from the sprocket 215 mounted upon the shaft 216 on which the transfer sprockets 52 are also mounted. The conveyor chains 210 are supported throughout a portion of their length by the curved guides 217 supported from the frame of the machine. The chain 210 is provided at suitable intervals with the push arms 218 for the purpose of pushing the work carrier bar in a manner described below. The shafts 212 and 216 are supported in bearing blocks 219 and 220 (Figure 23) secured to the vertical frame members 1 of the machine, as by the bolts 221.

The inter-chain conveyor chains 210 are arranged so that they pass through the set-down cradles 225 (Figures 22, 23, 28 and 29). These cradles are mounted upon brackets 226 secured to the vertical frame members 1, as by the bolts 227.

The set-down cradles 225 consist of spaced plates 228 separated by the spacers 229 (Figures 23 and 29), these being held together by the bolts 230. It will be observed that the plates 228 are provided with level upper edges 231 terminating in upwardly projecting stop portions 232.

In operation, the main conveyor chains 26, the end conveyor transfer chain 50 and the secondary conveyor chains 71 are driven in timed relationship. Assuming that empty work carrier bars are being conveyed across the top of the machine (Figure 1) on the chains 26 from the unloading end to the loading end of the machine, these work carrier bars begin to move downward in a vertical direction after the conveyor chains 26 pass over the sprockets 31. As the work carrier bars approach the cradles 225, their clamps are caused to grasp the work sheets in the manner previously described. While the work carrier bars are on the chains 26, they are supported upon pins extending horizontally from the conveyor chains 26 engaging the V-shaped sockets 159 at the ends of the bars.

When the carrier bars encounter the set-down cradles 225, they come to a position of rest upon the level portions 231 thereof. Meanwhile the pusher arms 218 of the inter-chain conveyor chains 210 pass between the side plates 226 of the cradles 225 and encounter the pins 158 forming a portion of the ends of the carrier bars having the sockets 159. The carrier bars are pushed along the level portion 231 of the cradles 225 by this means until the pusher arms 218 pass downward and disengage themselves from the pins 158, as the ends of the carrier bars move up against the stop projections 232 of the cradle. The sockets 159 on the ends of the carrier bars are then in a position where they are in line with the outwardly extending pins 233 on the end transfer chains 50. When these pins reach the sockets 159, the work carrier bars are lifted bodily from the set-down cradles 225 and carried along by the end transfer chains 50. The latter transport the carrier bars over the end of the first tank and deposit them upon the secondary conveyor chains 71, from which they proceed to the subsequent transfer chains in the manner previously described. In this way the work carrier bars and their contents are shifted from the downwardly-moving main conveyor chains 26 to the upwardly-moving transfer chains 50.

The inter-chain conveyor mechanism at the unloading end of the machine (Figures 24 and 25) serves the similar purpose of preventing shock to the work carrier bars and their contents after the latter have been passed through the various solutions and are reaching the unloading positions at the righthand end of the machine in Figures 1 and 2. As the work carrier bar proceeds downward on the end transfer chain 55 by the agency of the pins 234 engaging the end sockets 159, the work carrier bar is deposited upon the set-down cradles 239 at the unloading end of the machine. The set-down cradles 239 are supported by the brackets 240 mounted upon the frame uprights 2. The set-down cradles 239 are similar in principle and general construction to the set-down cradles 225, hence a repetition of the description thereof is unnecessary. While the work carrier bars are resting upon the set-down cradles 239, their pins 158 are engaged by the pusher arms 241 of the inter-chain conveyor chains 242 and moved along the upper edges 243 of the side plates 244 thereof.

Each inter-chain conveyor chain 242 at the unloading end of the machine moves in an approximately triangular orbit and is driven by the sprocket 245. The latter (Figures 24 and 25) is mounted upon the shaft 246 and driven by the sprocket 247 also keyed to this shaft. The sprocket 247 is driven by the chain 248 from the sprocket 249 on the shaft 250, the latter being the same shaft which carries the sprocket 57 for the transfer chain 55. The shafts 246 and 250 are mounted in bearing blocks 251 and 252 secured to the frame uprights 2. Each conveyor chain 242 is additionally supported by the curved guide 253. An adjustment for tightening the chain is obtained by the agency of the screws 254 by which the curved guide 253 is moved toward or away from the frame bracket 255 upon which it is supported. Each frame bracket 255 is secured to a frame upright 2, as by the bolts 256.

In the operation of the inter-chain conveyor mechanism at the unloading end of the machine, the work carrier bars and their contents are lifted out of the end tank 22 and carried to the unloading end of the machine by the transfer chains 55, where they are deposited upon the set-down cradles 239. Meanwhile the synchronized motion of the inter-chain conveyor chain 242 causes its arm 241 to pass between the spaced plates 244 of the set-down cradle 239 and engage the downwardly extending pin 158 on the end of the work carrier bar. This occurs on both sides of the machine, so that the work carrier bar is urged forward along the upper edges 243 of the set-down cradles 239.

In the meantime the work carriers are operated to release their contents, the plated sheets being deposited in any suitable containers. The empty work carrier bars then continue to move forward until their end sockets 159 are engaged by the laterally projecting pins 260 of the upwardly-moving chains 26. The empty work carrier bars are then carried upward by the chains 26, conveyed along the top of the entire length of the machine, and carried downwardly near the frame uprights 1 to be reloaded with unplated work sheets. The foregoing cycle of operations is then repeated in the manner previously described.

It will be understood that we desire to comprehend within our invention such modifications as may be necessary to adapt it to varying conditions and uses.

Having thus fully described our invention, what we claim as new and desire to secure by Letters Patent is:

1. An electroprocessing machine comprising means for gripping a sheet of material to be treated, a carrier for supporting said gripping means, vertical conveying devices for vertically transporting said carrier, horizontal conveying devices for horizontally transporting said carrier to cause said sheet to move through the treating solutions, vertical transfer devices for vertically transferring said carrier and said sheet over the boundaries between the treating tanks and intermediate conveyor means for shifting said carrier between said vertical conveying and transfer devices without substantial shock.

2. In an electroprocessing machine, a plurality of treatment tanks, a plurality of work carrier rods, a vertically moving return chain for said carrier rods, a setdown cradle, adapted to receive the carrier rods deposited by said return chain, an interchain conveyor for shifting the rod on the cradle, and an end transfer chain adapted to pick up said rod from said cradle and transfer it over the end of one of said tanks, whereby to shift the carrier rod without substantial shock from one chain to the other without stopping the chains.

3. An electroprocessing machine comprising a carrier for supporting work pieces to be treated at a plurality of stations, conveying devices for transporting said carrier in one direction, conveying devices for transporting said carrier in another direction, intermediate conveying means for shifting said carrier between said devices whereby to avoid substantial shock to said work pieces on said carrier, and a horizontally moving conveyor for transporting said carrier horizontally from station to station along said machine.

4. An electroprocessing machine comprising a carrier for supporting work pieces to be treated at a plurality of stations, a conveyor moving in one direction, a second conveyor moving in another direction, an intermediate conveyor arranged to transport said carrier between said first and second conveyors whereby to avoid substantial shock to said work pieces on said carrier, and a horizontally moving conveyor for transporting said carrier horizontally from station to station along said machine.

5. An electroprocessing machine comprising a carrier for supporting work pieces to be treated at a plurality of stations, a conveyor moving in one direction, a second conveyor moving in another direction, means adapted to remove said work carrier from said first conveyor, and an intermediate conveyor arranged to transport said carrier from said removing means to a location where it is adapted to be engaged and picked up by said second conveyor.

6. An electroprocessing machine comprising a carrier for supporting work pieces to be treated at a plurality of stations, a conveyor moving in one direction, a second conveyor moving in another direction, a cradle adapted to receive said work carrier when said work carrier is deposited thereon by said first conveyor, and an intermediate conveyor adapted to move said work carrier along said cradle and into a position to be engaged by said second conveyor.

7. In an electroprocessing machine having a plurality of tanks, a plurality of work carriers, vertically moving work carrier conveyor means, horizontally moving work carrier conveyor means for transporting said work carriers horizontally through said tanks, vertically moving work carrier transfer means for transfer of the work carriers from tank to tank, and intermediate conveyor means for shifting said work carriers between said vertical conveyor and vertical transfer means without substantial shock thereto.

8. In an electroprocessing machine having a plurality of tanks, a plurality of work carriers, vertically moving work carrier conveyor means, horizontally moving work carrier conveyor means for transporting said work carriers horizontally through said tanks, vertically moving work carrier transfer means for transfer of the work carriers from tank to tank, said vertically moving transfer means being arranged to travel more rapidly than said horizontally moving conveyor means, and intermediate conveyor means for shifting said work carriers between said vertical conveyor and vertical transfer means without substantial shock thereto.

9. In an electroprocessing machine having a plurality of tanks, a plurality of work carriers, vertically moving work carrier conveyor means, horizontal conveyor means for conveying said work carriers horizontally through said tanks, vertical transfer means for transferring said work carriers vertically from tank to tank away from and back to the horizontal conveyor means, means on said work carriers for supporting a plurality of work sheets in parallel vertical spaced relationship, and intermediate conveyor means for shifting said work carriers between said vertical conveyor and vertical transfer means.

10. In an electroprocessing machine having a plurality of tanks, a plurality of work carriers, vertically moving work carrier conveyor means, horizontal conveyor means for conveying said work carriers horizontally through said tanks, vertical transfer means for transferring said work carriers vertically from tank to tank away from and back to the horizontal conveyor means, means on said work carriers for supporting a plurality of work sheets in parallel vertical spaced relationship, and intermediate conveyor means for shifting said work carriers between said vertical conveyor and vertical transfer means, said supporting means including oppositely directed pointed members adapted to detachably grip the upper edges of said sheets between the points of said pointed members.

11. In an electroprocessing machine having a plurality of tanks, a plurality of work carriers, vertically moving work carrier conveyor means, horizontal conveyor means for conveying said work carriers horizontally through said tanks, vertical transfer means for transferring said work carriers vertically from tank to tank away from and back to the horizontally moving work carrier means, receiving means arranged to receive work carriers deposited thereon from said vertically moving work carrier conveyor means, and intermediate conveyor means for shifting said work carriers along said receiving means between said vertical conveyor means and said vertical transfer means.

12. In an electroprocessing machine, a plurality of treatment tanks, a plurality of work carriers, a return conveyor for transporting said work carriers between the unloading zone and the loading zone of said tanks, an end transfer conveyor for transferring said work carriers over the end of one of said tanks, an intermediate conveyor for shifting said work carriers between said return conveyor and said end transfer conveyor without substantial shock thereto, a tank conveyor for moving said work carriers horizontally relatively to said tanks, and means on said conveyors for detachably engaging said work carriers to effect the transportation and transference thereof from one conveyor to another.

GEORGE B. HOGABOOM.
WESLEY F. HALL.